(12) United States Patent
Canter

(10) Patent No.: US 8,666,871 B1
(45) Date of Patent: Mar. 4, 2014

(54) SYSTEM AND METHOD FOR HANDLING TRADES BY ADVISERS TURNING INDEPENDENT

(75) Inventor: David E Canter, Menlo Park, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 495 days.

(21) Appl. No.: 11/713,152

(22) Filed: Feb. 28, 2007

(51) Int. Cl.
*G06Q 40/00* (2012.01)

(52) U.S. Cl.
USPC .............................. 705/37; 705/35; 705/36 R

(58) Field of Classification Search
USPC ........................................... 705/36 R, 35–45
See application file for complete search history.

(56) References Cited

U.S. PATENT DOCUMENTS

| | | | | |
|---|---|---|---|---|
| 6,324,523 | B1 * | 11/2001 | Killeen et al. ............... | 705/36 R |
| 6,408,282 | B1 * | 6/2002 | Buist ........................... | 705/36 R |
| 7,356,497 | B1 * | 4/2008 | Bursey et al. ................ | 705/36 R |
| 2001/0034678 | A1 * | 10/2001 | Lerner et al. ................. | 705/35 |
| 2002/0198815 | A1 * | 12/2002 | Greifeld et al. ............... | 705/37 |
| 2003/0004863 | A1 * | 1/2003 | Cliff ............................. | 705/37 |
| 2003/0018561 | A1 * | 1/2003 | Kitchen et al. ............... | 705/37 |
| 2007/0038552 | A1 * | 2/2007 | Himmelstoin ................ | 705/37 |
| 2007/0061231 | A1 * | 3/2007 | Kim-E .......................... | 705/35 |
| 2008/0228627 | A1 * | 9/2008 | Himmelstein ................ | 705/37 |

FOREIGN PATENT DOCUMENTS

WO      WO97/15885      *   5/1997   ............. G06F 13/00

OTHER PUBLICATIONS

Buckley, JP et. al., Processing Noisy Structured Textual Data Using a Fuzzy Matching Approach Application to Postal Address Errors; XP-001132075; pp. 195-205 (11 pages); Dec. 2000.*

* cited by examiner

*Primary Examiner* — Robert Niquette
(74) *Attorney, Agent, or Firm* — Innovation Partners; Charles E. Gotlieb

(57) ABSTRACT

A system and method allows an adviser/registered representative to act as an adviser to clients at a fee-only broker/custodian, and as a broker to the same clients at an independent broker-dealer. Non-commission-based trades are cleared and settled by the fee-only broker/custodian and commission-based trades are made by the independent broker-dealer using a clearing firm. The clearing firm settles the commissioned trades at the fee-only broker/custodian, where all the assets can be custodied.

2 Claims, 7 Drawing Sheets

SYSTEM AND METHOD FOR HANDLING TRADES BY ADVISERS TURNING INDEPENDENT

FIELD OF THE INVENTION

The present invention is related to computer software and more specifically to computer software for securities trading.

BACKGROUND OF THE INVENTION

Some investors rely on a registered representative or broker at a wire house to handle investing in securities. The broker may charge a fee to the investor for the services the broker performs, or may receive a commission and/or other fees from the mutual fund or manager of a security the broker has purchased.

The wire house handles administrative functions for the broker, and receives a portion of the fees described above. The administrative functions can include clearing and settlement of trades; custody of securities; legally required supervision of the broker, including monitoring activities of the broker for compliance with securities laws; and review of trades proposed by the broker for suitability with the investment objectives of the investors affected. Wire houses also perform marketing functions for the brokers, helping to bring new clients to the broker.

If a broker seeks to operate in a more independent fashion, or becomes dissatisfied with the wire house, one option for the broker is to move to another firm. However, if the broker does not require the marketing functions provided by a wire house, for example, because the broker has a sufficient number of clients, or wishes to perform the marketing functions himself, the broker may not wish to move to another wire house. Smaller wire houses may take a smaller fee and perform fewer marketing functions, but the services that they do provide may be less than the current state of the art, so many former brokers of wire houses do not wish to work for them.

Other companies provide state of the art facilities, but only for a portion of the market. For example, independent broker-dealers allow registered representatives to associate with them, and can perform certain supervisory roles to allow the broker leaving a wire house to continue to sell securities in a commission based environment, but the set of mutual funds that brokers can sell for continuing compensation, and the tools they provide for selecting such funds, may be limited. Fee-only brokerages may provide a wider array of funds and selection tools, but they may not be able to provide the supervisory functions a broker requires to make commission originated investments under the securities laws.

Brokers may be additionally reluctant to move from a wire house because they do not want to give up the stream of income that ongoing transaction and other fees may generate from assets they have purchased for their clients.

What is needed is a system and method for a broker that can allow the broker access to the products, services, and tools of a fee-only broker/custodian, but provides supervisory functions for the broker, and allows ongoing service fees to be received by the broker without the amount of fees that are taken by a conventional wire house.

SUMMARY OF INVENTION

A system and method allows a broker at a wire house to enroll as an independent investment adviser at a fee-only broker/custodian, and as a broker at an independent broker-dealer, and service clients in a manner that allows both commission originated and non-commission originated trades to be made and a single statement to be received by the clients without being located at a wire house. The broker can receive the benefits of the offerings made by the fee-only broker/custodian, while receiving legally-required supervision from the independent broker-dealer.

The clients open accounts at the fee-only broker/custodian and provide the adviser/registered representative with certain authorities, allowing the adviser/registered representative to make trades using the client's account. The clients also open an account with a different party, a clearing firm. The clients direct the clearing firm to transfer assets received by the clearing firm on their behalf to the account at the fee-only broker/custodian, either manually, at various times when such assets are being held by the clearing firm, or the clients may direct the clearing firm to automatically transfer any assets received on an ongoing basis. The clients also open an account at an independent broker-dealer, and provide suitability information the broker-dealer can use to supervise certain trades. The clients then direct the transfer of their existing non-commission assets to the fee-only broker/custodian, and commission assets to the clearing firm, and these firms receive them. On instructions from the client, the clearing firm then transfers the commission assets to the fee-only broker/custodian for custody there. The former broker now acts as an adviser/registered representative: as an adviser at the fee-only broker/custodian, and as a registered representative at the independent broker-dealer.

Fees are charged by the adviser/registered representative, who notifies the independent broker-dealer of the fees, which deducts the fees from the client accounts. The fee-only broker/custodian also makes downloads of assets, activity and other information about the client accounts available to the adviser/registered representative and/or the independent broker-dealer, to assist the independent broker-dealer in performing its supervisory duties, including compliance and auditing functions required under the securities laws or otherwise conventionally performed.

If a trade is to be made, the adviser/registered representative determines whether to make the trade on a commission originated or non-commission originated basis, the basis either being determined by the security the adviser/registered representative wishes to trade, or by the adviser/registered representative's selection.

If the trade will be made on a non-commission originated basis, the adviser/registered representative instructs the fee-only broker/custodian to perform the trade, and the fee-only broker/custodian clears (or uses a third party to clear) the trade and settles using the client account.

If the trade will be made on a commission originated basis, the adviser/registered representative notifies the independent broker-dealer of the trade and the account number of the client at the independent broker-dealer. The investment decision to trade should correspond to suitability information the client has provided, and the independent broker-dealer reviews the trade against the suitability information to ensure that the trade is suitable for that client. If the trade is suitable, the independent broker dealer requests the clearing firm to make the trade, and optionally provides identifiers of the fee-only broker/custodian, the client's account at the fee-only broker/custodian, and a location of settlement. The trade is executed by the clearing firm, checked against the client account at the fee-only broker/custodian, and settled at the fee-only broker/custodian. Any assets received by the clearing firm are held by the clearing firm until the client requests the clearing firm to provide the assets to the fee-only broker/custodian, and the clearing firm transfers the assets in response, or the clearing firm may automatically transfer the assets to the fee-only broker/custodian upon their receipt. The clearing firm or independent broker-dealer will provide confirmation of transactions it executes, and, depending upon the circumstances, the fee-only broker/custodian may send a notice of execution to the client. Any commissions or ongoing service fees due on commission originated transactions will be paid to the clearing firm, which pays them to the independent broker-dealer, which in turn may take a cut of the commission(s)/fee(s) and forward the remainder to the adviser/registered representative in his capacity as a broker.

DETAILED DESCRIPTION OF A PREFERRED EMBODIMENT

Figure 1:
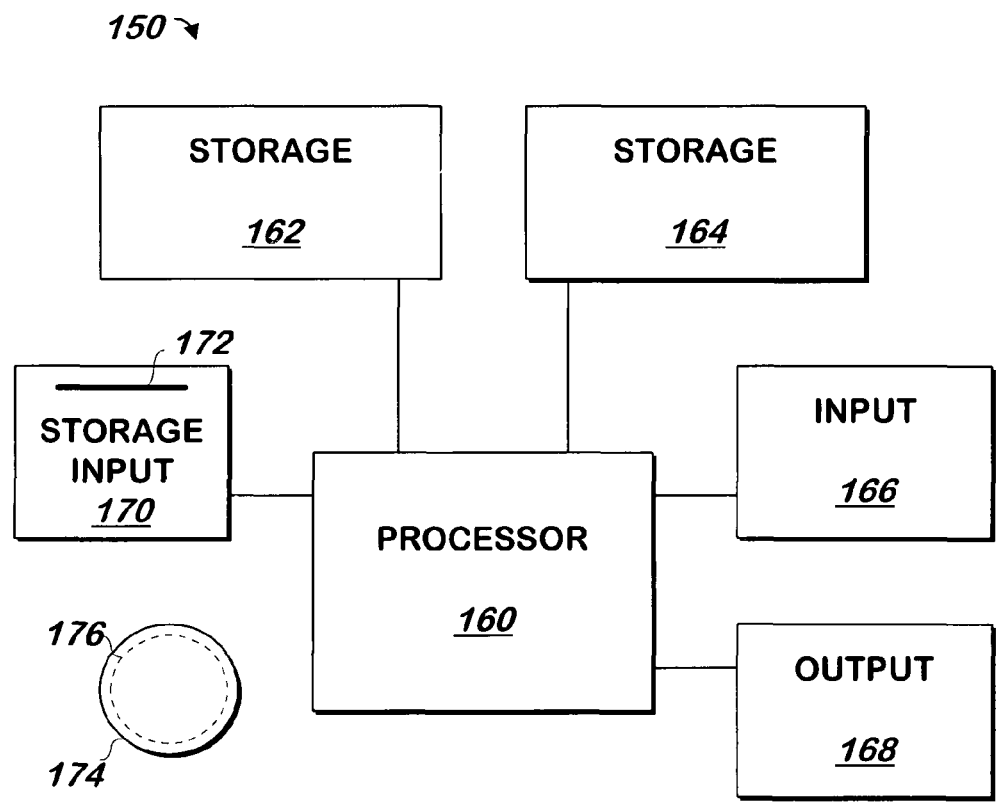
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a Conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
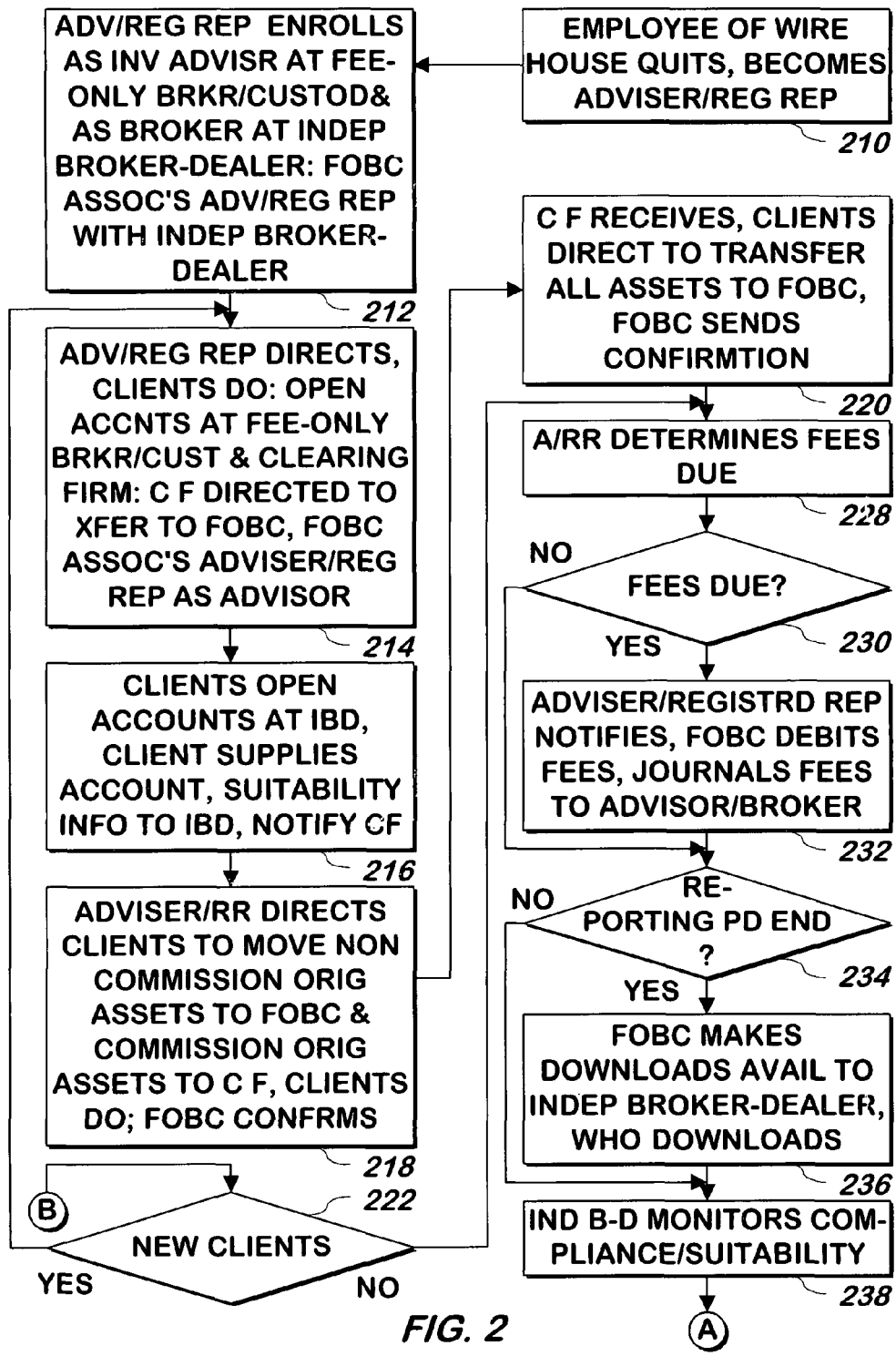
FIGS. 2, 3, and 4 are a flowchart illustrating a method of trading and investing in securities according to one embodiment of the present invention.
Figure 3:
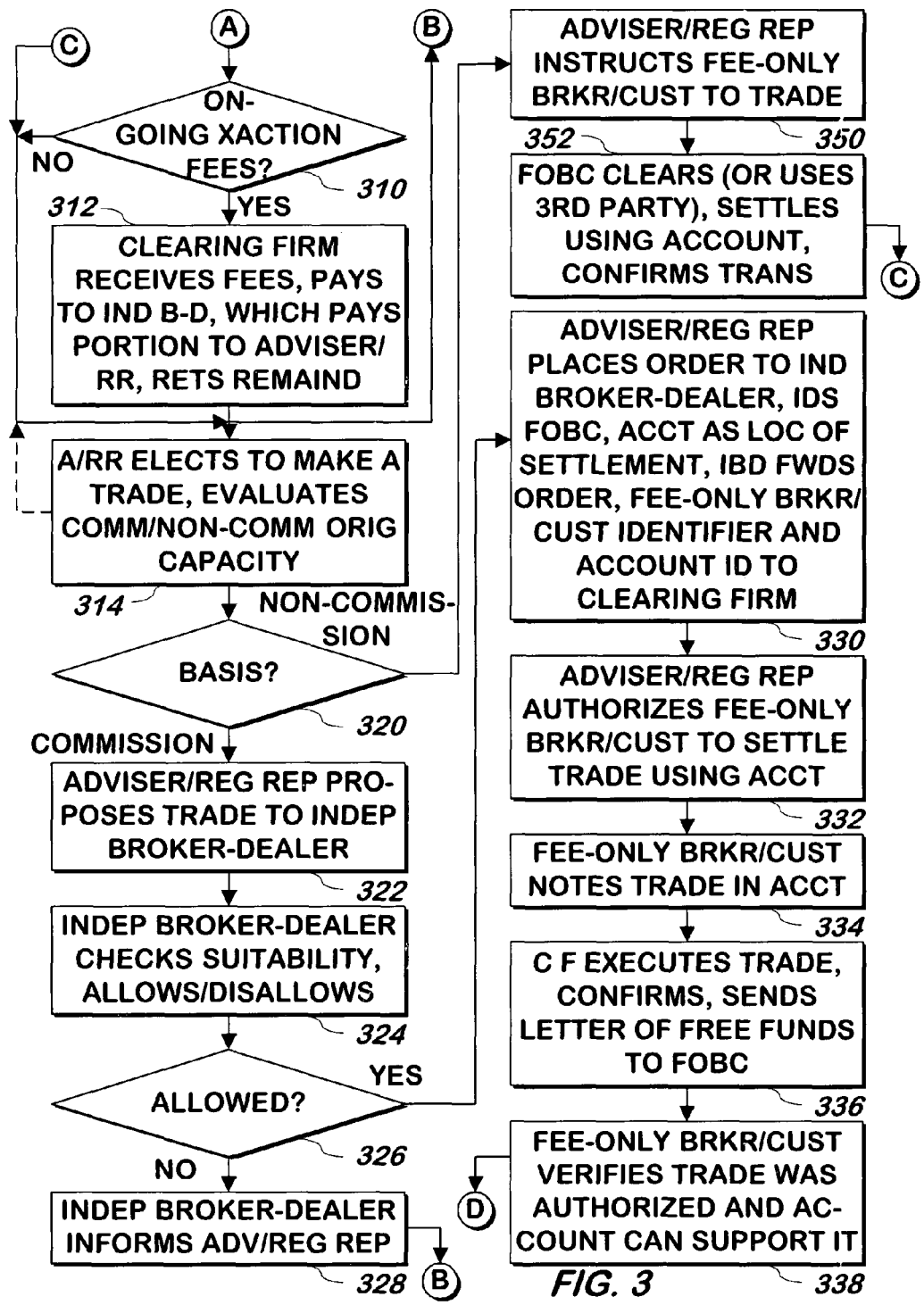
Figure 4:
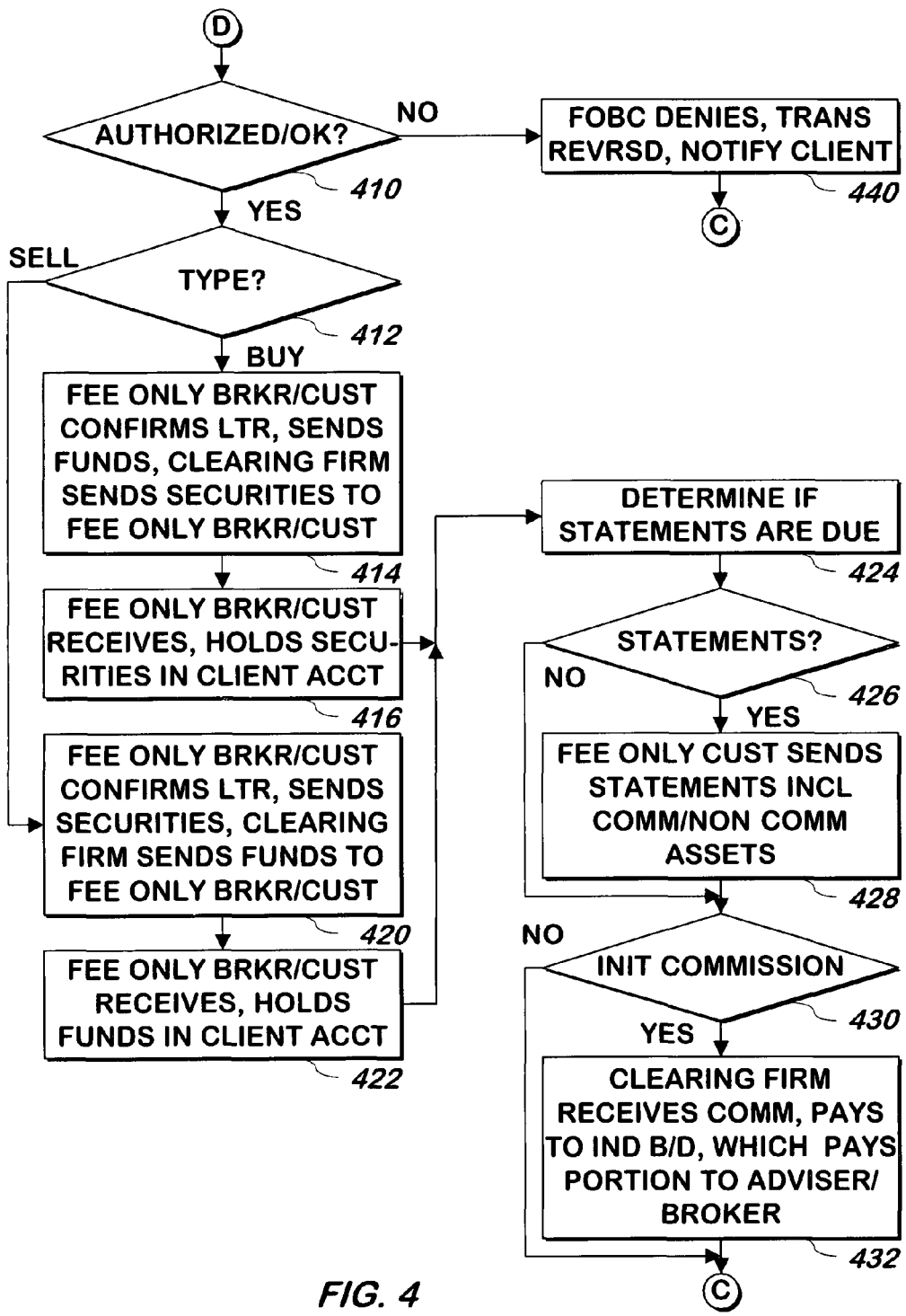

FIGS. 2, 3, and 4 are a flowchart illustrating a method of trading and investing in securities according to one embodiment of the present invention. Referring now to FIG. 2, a broker employee of a wire house quits and becomes an adviser/registered representative as described in more detail herein 210. The adviser/registered representative enrolls as an investment adviser at a fee-only broker/custodian and also associates as a registered representative at an independent broker-dealer 212. The fee-only broker/custodian is a party different from, and one that neither organizationally controls (e.g. from a corporate standpoint) nor is under the organizational control of, the independent broker-dealer, and they both are not under organizational (as opposed to regulatory) control of a single entity. At such time of enrollment, the fee-only broker/custodian associates the adviser/registered representative with an identifier of the independent broker-dealer who will supervise the adviser/registered representative in his capacity as a broker as part of step 212.

The adviser/registered representative directs the clients transferring with him to open accounts at a fee-only broker/custodian and at a clearing firm 214. In one embodiment, the clearing firm is a party different from, not organizationally controlling and not organizationally controlled by, the fee-only broker/custodian, and may also be different from, and not organizationally controlled by or organizationally controlling, the independent broker-dealer, although the clearing firm has a contractual relationship with the independent broker-dealer. In such embodiment, both such entities are also not under organizational control of a single party. The clients comply with this request and open such accounts. As part of step 214, the clients provide the address to which confirmations should be sent to each such party, and also instruct the fee-only broker/custodian to allow the adviser/registered representative to act in the capacity of their investment adviser, allowing the adviser/registered representative to make trades on behalf of the client account at the fee-only broker/custodian, and the fee-only broker/custodian complies with such request. Also as part of step 214, the fee-only broker/custodian will associate the adviser/registered representative with each client account, and thereby associate the independent broker-dealer with each client account. In one embodiment, when they open the accounts at the clearing firm, the clients may direct the clearing firm to always settle using their accounts at the fee-only broker/custodian, and the fee-only broker/custodian associates with the account at the clearing firm an identifier of the fee-only broker/custodian and the client's account number, each received from the client or adviser/registered representative as part of step 214. In another embodiment, the clearing firm may transfer assets to the client's account at the fee-only broker/custodian only when specifically instructed to do so by the client.

Clients of the adviser/registered representative open 216 accounts at the independent broker-dealer, and the clients supply, and the independent broker-dealer associates with their respective accounts, suitability information to the independent broker-dealer that allows investment suitability monitoring to occur. In one embodiment, the adviser/registered representative provides to the independent broker-dealer (or the client provides this information), for each such account, identifiers of the corresponding account(s) at the fee-only broker/custodian (including an identifier of the fee-only broker/custodian and the account) and at the clearing firm, and the independent broker-dealer associates the account numbers and identifiers of the fee-only broker/custodian and the clearing firm with the account identifier at the independent broker-dealer, all as part of step 216. Also as part of step 216, the clearing firm is notified of the client's account identifier at the independent broker-dealer.

In one embodiment, the fee-only broker/custodian is an organization that does not organizationally control, and is not under organizational control of, the independent broker-dealer, or the clearing firm. However, the clearing firm may be under control of, or may control, the independent broker-dealer. Either of these entities may be part of a wire house, as long as they are not all part of the same wire house or under organizational control of the same wire house or controlled by the same wire house.

The adviser/registered representative directs the clients to direct the wire house to transfer all commission originated assets to the independent broker-dealer's clearing firm and all non-commission originated assets to the fee-only broker/custodian 218.

As used herein, a "commission originated" asset or security, or an asset or security traded on a "commission originated" basis, is one for which all, almost all, or a majority or supermajority (e.g. ⅔ or ¾ or another fraction between ½ and 1) of the compensation resulting from the asset that the advisor/registered representative expects to earn or actually earns in a first period of time such as one or more years (e.g. two years) from the date of acquisition will be from (e.g. part of or all of or based upon) a commission paid by a certain party or parties (e.g. the client, the securities issuer, the fee-only broker/custodian, the independent broker-dealer or the clearing firm) for acquisition of the asset, or from an ongoing fee paid by the securities issuer, as opposed to a investment management fee or advisory fee assessed to the client on a basis involving a second period of time, which may be the same or different from the first period of time, such as a yearly fee or a quarterly fee. A "non-commission originated" asset or security or an asset or security traded on a "non-commission originated" basis is one that is not a commission originated asset, such as those for which all, almost all, or a majority or a supermajority of the compensation resulting from the asset that the advisor/registered representative expects to earn in the first period of time is an investment management fee or advisory fee assessed on a basis that involves a second period of time and paid by a party, such as the client, that is not the issuer of the asset. In one embodiment, a commission originated asset may be any asset that may be traded by the independent broker-dealer, while a non-commission originated asset may be any asset that may be traded by the fee-only broker/custodian. For example, a commission originated asset may be one for which the advisor/broker receives some or all of any commission paid by the client or by the issuer of the securities for the purchase of the asset, and a non-commission originated asset is one for which the advisor/broker receives no commissions, or commissions that are significantly less than those from non-commission originated assets. Commissions may be charged or paid by any party on non-commission originated assets as well as commission-originated assets, and some commissions may flow to the advisor/registered representative based on the purchase of a non-commission originated asset. "Commission originated" and "non-commission originated" thus have meanings consistent with such description.

The clearing firm receives such assets and then moves 220 all assets it receives from such clients to the fee-only broker/custodian in accordance with the instructions of the adviser/registered representative, or of the clients, on each account for which the assets were received and the fee-only broker/custodian receives such assets. In one embodiment, steps 218 and 220 include providing a confirmation or other notice to the clients that such assets have been so moved by the wire house and the clearing firm. Any or all of the clearing firm, wire house, or fee-only broker/custodian may provide such confirmation or other notice. Additionally, as part of steps 218 and 220, any of these parties may provide notification of the transfer, including identification of the party and the account number of the party), such notification either describing only the initial transfer from the wire house, or the transfer to the fee-only broker/custodian, to the issuer of the securities or its agent, including the name or other identifier of the fee-only broker/custodian and the account number at the fee-only broker/custodian into which the assets were transferred.

The adviser/registered representative may determine whether any fees are due on the account 228. If any fees are due 230, the adviser/registered representative notifies and instructs the fee-only broker/custodian to deduct fees from the client account, and the fee-only broker/custodian does so. In one embodiment, the fee-only broker/custodian only deducts fees for assets that were non-commission originated, though in other embodiments, fees may also be deducted based on commission-originated assets under certain circumstances, such as only deducting for such assets held for more than a threshold period, such as two years, the date of such acquisition being retained by the fee-only broker/custodian when the assets are purchased. The adviser/registered representative may receive information from the fee only broker/custodian that allows the adviser/registered representative to calculate the fees and specify a dollar amount, or the fee-only broker/custodian may calculate the fees based on a percentage provided by the adviser/registered representative. The fee-only broker/custodian journals such fees to the adviser/registered representative 232, for payment to the individual adviser or to an advisory firm associated with that adviser/registered representative, and the method continues at step 234. If no fees are due 230, the method continues at step 234.

In one embodiment, the fee-only broker/custodian provides, or otherwise makes available to the independent broker-dealer associated with each respective account, reports, for example at the end of a reporting period, which may be monthly, weekly, daily or shorter or longer. At step 234, if the reporting period has not ended, the method continues at step 238. Otherwise, if the reporting period has ended 234, the fee-only broker/custodian makes downloads of a listing of the assets being held in the account, as well as other account information such as all account activity within a past period of time (e.g. the past two months), available to the independent broker-dealer. The information may include an indication, for each asset, as to whether the asset was commission originated or non-commission originated, which may be identified and stored with each asset based on whether the asset was cleared by the fee-only broker/custodian or received directly from the wire house (non-commission-originated assets) or was received from another source, or in another embodiment, such indications may be provided by the advisor/registered representative to the independent broker-dealer. The information may include the date any security was purchased or received by the fee only broker/custodian. The independent broker-dealer may then download such information at the convenience of the independent broker-dealer 236. In one embodiment, downloads are made available continuously, and so the reporting period may be a very brief amount of time. The account number at the fee-only broker/custodian, the account number of the adviser/registered representative, or both of these, may be provided as part of the downloads.

At step 238, the independent broker-dealer uses the downloads to monitor compliance and suitability in accordance with the securities laws and rules 238 using conventional techniques. The method continues at step 310 of FIG. 3.

Referring now to FIG. 3, if ongoing service fees are received 310, in one embodiment, the clearing firm receives such fees and transfers some or all of them to the independent broker-dealer, which journals a portion of the fees to the adviser/registered representative, retaining the remainder 312. Ongoing service fees are fees paid for commission originated assets for a reason other than the initial transfer of the assets, for example, account maintenance fees and the like. The method continues at step 314. If no fees are received 310, the method continues both at step 314 and at step 222 of FIG. 2.

At step 314, the adviser/registered representative elects to make a trade. As shown by the dashed line in the Figure, step 314 may occur as an independently running process. As part of step 314, when the adviser/registered representative elects to make a trade, the adviser/registered representative evaluates in consultation with its client (or according to client instructions or agreement) whether to make the trade on a commission originated or non-commission originated basis. In one embodiment, each security may be traded on either a commission originated basis or a non-commission originated basis, or the adviser/registered representative may have the option of selecting whether or not the fees to be paid to the adviser/registered representative are paid on a commission originated or a non-commission originated basis. An administrative system provided by the independent broker-dealer or by another party may indicate the available basis on which a given security can be traded.

If the adviser/registered representative determines that the security should not be traded on a commission originated basis 320, the adviser/registered representative instructs the fee-only broker/custodian to make the trade 350, using the account number of the client for which the trade is being made. The fee-only broker/custodian either clears 352 the trade, or uses a third party to clear the trade, and settles using the account of the client of the adviser/registered representative. In one embodiment, the fee-only broker/custodian sends a confirmation of the trade to the client, at the address provided as part of step 214.

If the adviser/registered representative wishes to make the trade on a commission basis 320, the adviser/registered representative proposes the trade to the independent broker-dealer using the account number of the client for which the trade is being made 322. The independent broker-dealer checks the suitability of the trade based on the suitability information that was provided by the client in step 216, and that is associated with the account provided by the adviser/registered representative. The independent broker-dealer either allows or disallows the trade 324 based on whether the trade would be suitable in light of the client's suitability information. If the independent broker-dealer allows the trade, the method continues at step 330. Otherwise 326, the independent broker dealer informs the adviser/registered representative that the trade is being disallowed 328, and the method continues at step 222 of FIG. 2. In another embodiment, the determination of suitability may be performed at any time, including after the trade is performed.

At step 330, the adviser/registered representative places an order for the allowed trade to the independent broker-dealer. If an identifier of the fee-only broker/custodian and account number at the fee-only broker/custodian is not already associated with the account for that same client at the independent broker-dealer, the adviser/registered representative provides that information to the independent broker-dealer as the location of the settlement for the trade, and the independent broker-dealer forwards that order, including the settlement information, to the clearing firm 330. The adviser/registered representative authorizes the fee-only broker/custodian to settle using the account at the fee-only broker/custodian 332. The fee-only broker/custodian notes the trade in the account 334.

The clearing firm clears the trade, and optionally sends a letter of free funds to the fee-only broker/custodian regarding the trade 336. The letter of free funds may be provided by the clearing firm either before or after the trade is executed. In the usual case, the letter of free funds is provided after the trade is executed with an opposite trade being made if, in response to the letter of free funds, the fee-only broker/custodian does not authorize the trade. In one embodiment, the clearing firm assigns a unique identifier to the transaction that is included on the letter of free funds, and the fee-only broker/custodian refers to the letter of free funds when authorizing or declining the trade. The letter of free funds also may contain the account number at the fee-only broker/custodian to be used for settlement, to allow the fee-only broker/custodian to process the letter of free funds. The clearing firm also sends a confirmation of the trade to the client as part of step 336.

The fee-only broker/custodian verifies that the trade was authorized and that the account referenced in the letter of free funds can support the trade 338. To support the trade, the fee-only broker/custodian verifies that the account has the funds or has access to the funds required to purchase any securities being purchased, or contains or has access to any securities being sold. The method continues at step 410 of FIG. 4.

It is noted that some non-commission originated assets may not be available for purchase through the independent broker-dealer, which may have a list of assets, or assets of a particular type or types, such as mutual funds, that may be purchased through it, and other assets or other assets of that type or types may not be purchased through it. One, or ten or a hundred or more of such other assets or assets of that type or types may be purchased as described herein through the fee-only broker/custodian, thereby providing a greater range of assets or assets of the type or types for purchase by the adviser/broker.

Referring now to FIG. 4, if the fee-only broker/custodian determines that the trade was authorized and the account can support the trade 410, the method continues at step 412. Otherwise, 410, if the fee-only broker/custodian determines that the trade was not authorized or that the account cannot support the trade, an opposite trade is made to reverse the transaction by the clearing firm, and a notification is sent to the client that the transaction was reversed 440. The method continues at step 314 of FIG. 3.

At step 412, if the type of transaction is to buy securities, the fee-only broker/custodian confirms the letter of free funds and sends the funds to the clearing firm. In one embodiment, the clearing firm sends the securities to the fee-only broker/custodian with the account number of the client's account at the fee-only broker/custodian that was associated with the client's account at the clearing firm or otherwise received by the clearing firm 414. In another embodiment, the clearing firm retains the securities on behalf of the client until instructed by the client to transfer the securities to the client's account at the fee-only broker/custodian. In the latter case, the clearing firm also indicates the securities being held, and the identifier of the fee-only broker/custodian of the client corresponding to the trade. In the embodiment that the clearing firm sends or is instructed by the client to send the securities to the fee-only broker/custodian, the fee-only broker/custodian receives the securities and the account number (or the transaction number referenced on the letter of free funds, which the fee-only broker/custodian can associate with the client's account corresponding to the letter) and holds the securities in the client account 416. In one embodiment, when the securities are provided by the fee-only broker/custodian and when the funds are provided to the fee-only broker/custodian, a reference to the trade identifier on the letter of free funds is made by each party providing such items.

In one embodiment, either the clearing firm or the fee-only broker/custodian also notifies the issuer of non-cash securities (e.g. the mutual fund manager or any other agent of the mutual fund manager who will track ownership of the securities) of the transfer to the fee-only broker/custodian, including the account number into which the shares were transferred. In another embodiment, no such notification is made. The method continues at step 424.

If the transaction is to sell securities 412, the fee-only broker/custodian confirms the letter of free funds, sends the securities to the clearing firm, and the clearing firm sends the funds to the fee-only broker/custodian 420, or holds them until directed to perform such sending, but notifies the fee-only broker/custodian of the assets being held, and the corresponding fee-only broker/custodian account number of the client corresponding to the trade, if such notification has not already otherwise been provided, for example in the letter of free funds. The clearing firm or fee-only broker/custodian receives and holds the funds in the client account 422. In one embodiment, the securities and funds are sent using the trade identifier associated with the letter of free funds that is assigned by the clearing firm. This allows the clearing firm and the fee-only broker/custodian to identify their respective account numbers, to which the identifier of the letter of free funds has been associated. Alternatively, or in addition, the account numbers may be provided in the letter of free funds and/or provided with the funds or securities. The method continues at step 424.

Periodically, such as monthly, the fee-only broker/custodian may additionally send the clients statements of the assets being held for each such client by the fee-only broker/custodian and optionally, the clearing firm. At step 424, a determination is made whether such statements are due any clients. If so 426, the fee-only broker/custodian sends such statements to each such client describing all assets held by the fee-only broker/custodian and the clearing firm, including assets that had been purchased for such client on a commission originated and non-commission originated basis, even those purchased before the account at the fee-only broker/custodian was opened 428. For example, the statements may include assets initially purchased for the client at the wire house. In one embodiment, the statements do not distinguish between assets that came from the wire house, assets that were commission originated, or non-commission originated, although some or all of the non-commission originated assets may be held in a separate account that is not distinguished as such in the statement (e.g. the statement may not indicate the existence of the separate account, but will include assets held in such account). The method continues at step 430. If no statements are due 426, the method continues at step 430.

At step 430, if an initial commission is received as a result of the trade, the clearing firm receives the commission and transfers the commission either in whole or in part to the independent broker-dealer, which journals a portion of the commission to the adviser/registered representative, retaining the remainder as its fee 432. In another embodiment, the independent broker-dealer may journal or pay all of the commission and obtain a fee from the adviser/registered representative that is not withheld from the commission it forwards. The method continues at step 314 of FIG. 3. If there is no initial commission resulting from the trade 430, the method continues at step 314 of FIG. 3.

In one embodiment, a majority of the assets in all of the accounts managed by any one adviser/registered representative as described above are non-commission originated assets, either at the time assets are transferred from the wire house, or within a threshold period of time thereafter.

In one embodiment, there is no clearing/carrying agreement between the fee-only broker/custodian and the independent broker/dealer, and neither the independent broker/dealer nor the clearing firm is able to direct the fee-only broker/custodian to make any trades.

System

Figure 5:
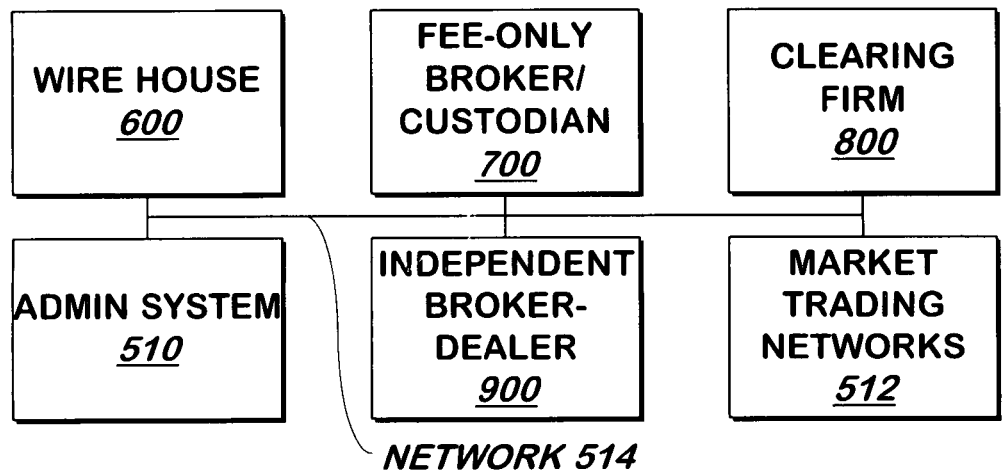
FIGS. 5, 6, 7, 8, and 9 are a block schematic diagram of a system for trading and investing in securities according to one embodiment of the present invention.
Figure 8:
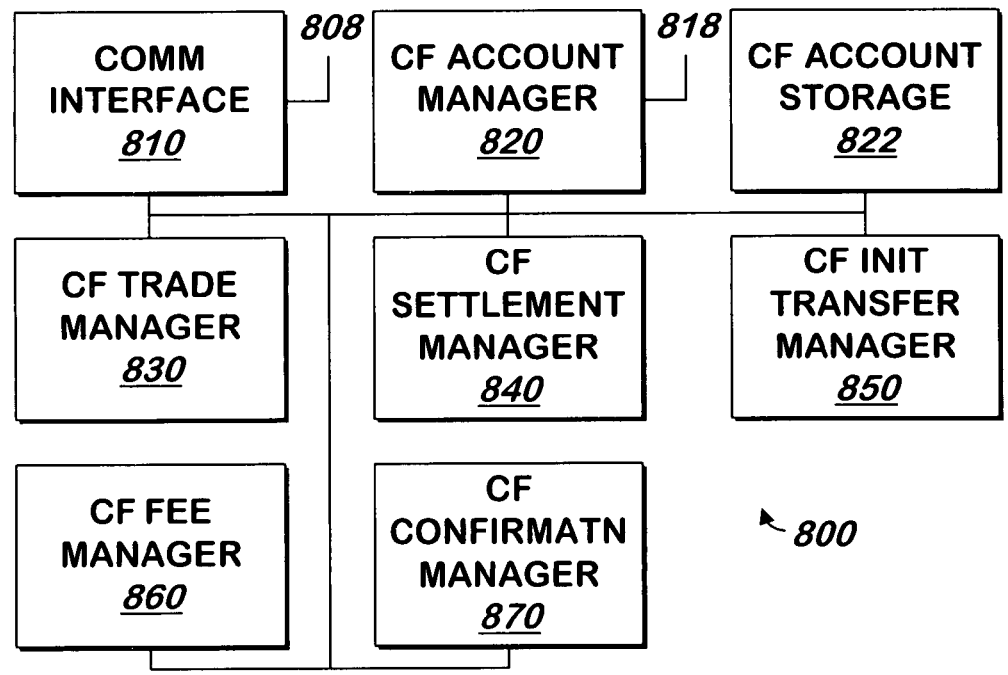
Figure 9:
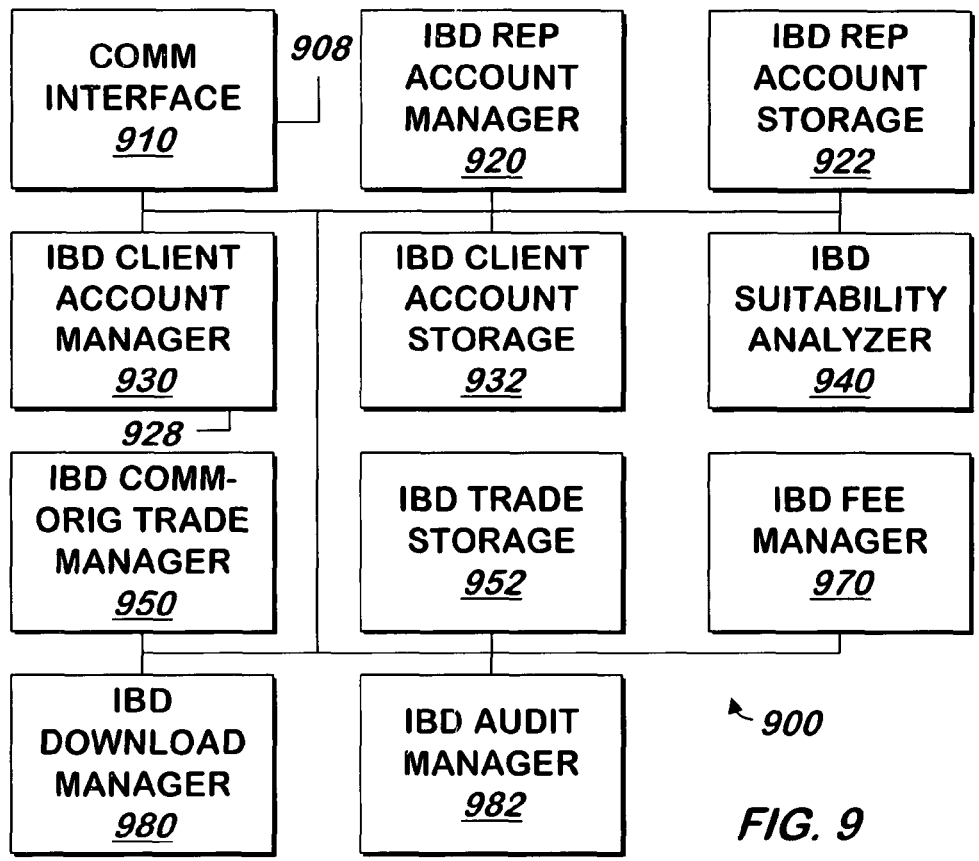
Figure 6:
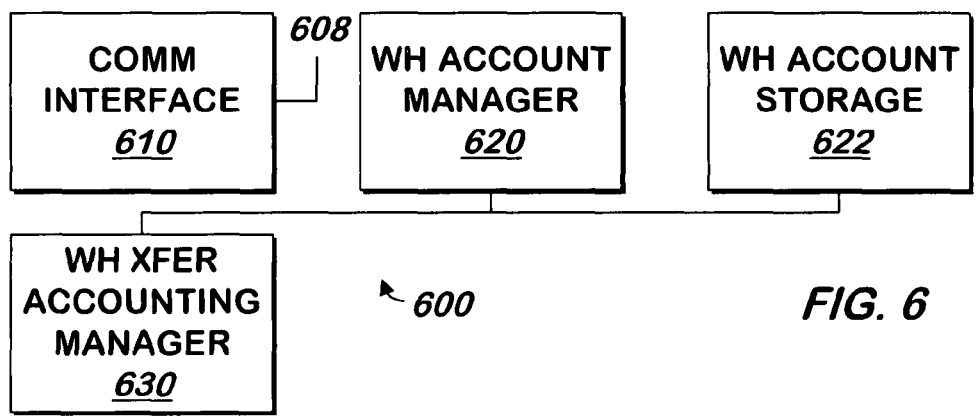
Figure 7:
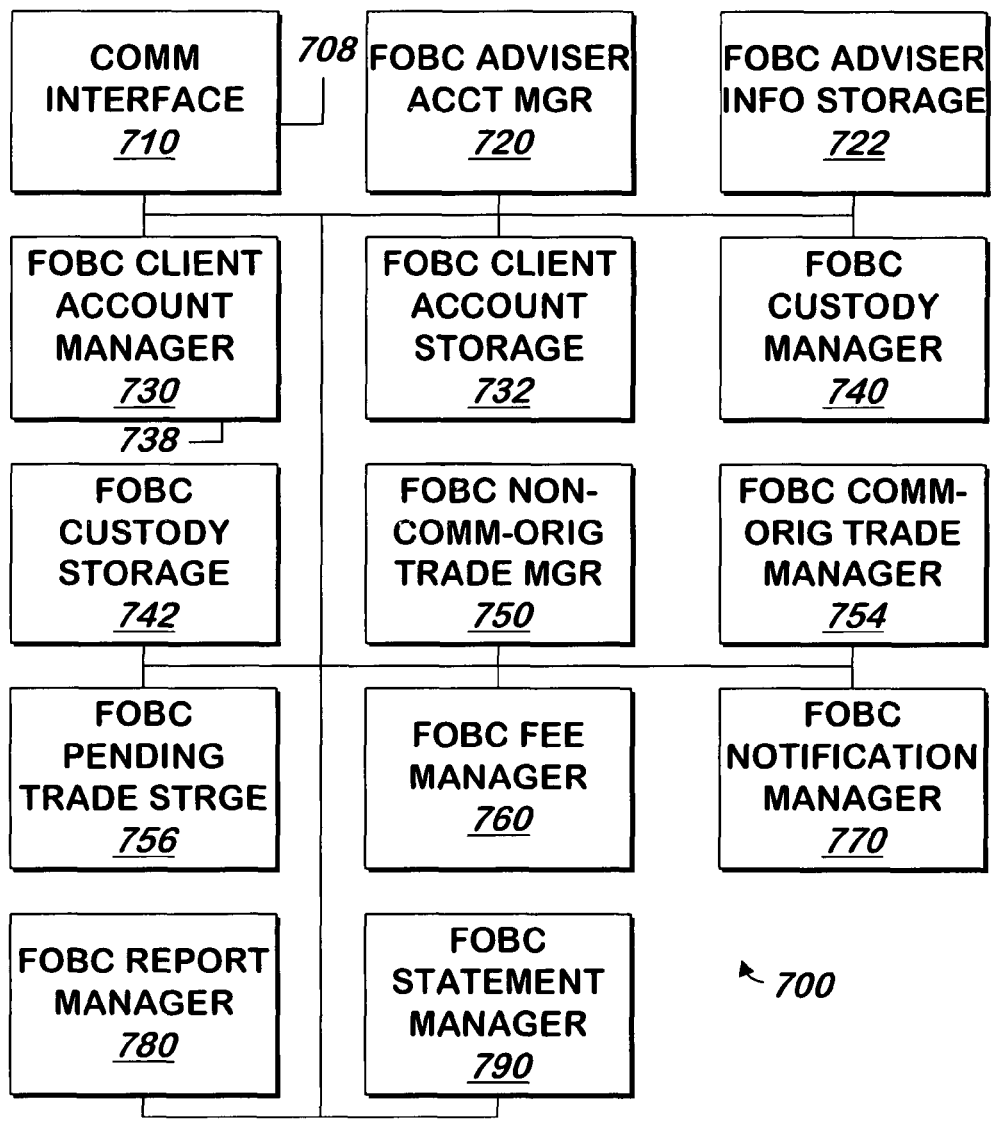

FIG. 5 is a block schematic diagram of a system for trading or investing in securities according to one embodiment of the present invention. FIG. 6 shows wire house 600 in more detail, according to one embodiment of the present invention. FIG. 7 shows fee-only broker/custodian 700 in more detail, according to one embodiment of the present invention. FIG. 8 shows clearing firm 800 in more detail, according to one embodiment of the present invention. FIG. 9 shows independent broker-dealer 900 in more detail, according to one embodiment of the present invention.

Referring now to FIGS. 5, 6, 7, 8, and 9, at any time, an employee (not shown) of wire house 600 may choose to trade securities for his clients (not shown) as an independent adviser/registered representative, rather than via wire house 600. In order to continue trading securities independently from wire house 600, the adviser/registered representative enrolls as an investment adviser with fee-only broker/custodian 700 and also associates as a registered representative with independent broker-dealer 900, as described in more detail herein and below.

To enroll as an investment adviser, the adviser/registered representative may for example request a registration web page hosted by fee-only broker/custodian 700. Such a request is received by fee-only broker/custodian adviser account manager 720 via input/output 708 of communication interface 710. In one embodiment, communications interface 710 is a conventional network interface such as a TCP/IP-capable communication interface, which may include a conventional modem, router, LAN interface card or the like, supporting TCP/IP, Ethernet, and other conventional communications protocols. Input/output 708 of communication interface 710 is coupled to network 514, which may include a conventional network such as the Internet or a local area network or both. In one embodiment, all communications into, and out of, fee-only broker/custodian 700 are made via communication interface 710 and input/output 708, and the various actors described herein employ conventional computer systems also connected to network 514 in order to perform the actions described.

When fee-only broker/custodian adviser account manager 720 receives the request to enroll as an investment adviser from the adviser/registered representative, fee-only broker/custodian adviser account manager 720 provides a user interface to the adviser/registered representative, allowing the adviser/registered representative to provide adviser enrollment information. In one embodiment, adviser enrollment information includes the name and address of the adviser/registered representative, and optionally identifying information, such as the name and address, of an independent broker-dealer (such as independent broker-dealer 900) who will supervise the adviser/registered representative in his capacity as a broker. Additional or alternate enrollment information may be used in other embodiments. Fee-only broker-custodian adviser account manager 720 receives the enrollment information from the adviser/registered representative and associates the enrollment information with a unique adviser identifier for that adviser/registered representative, and stores the adviser enrollment information and associated adviser identifier in fee-only broker/custodian adviser information storage 722. In one embodiment, fee-only broker/custodian adviser information storage 722 includes conventional memory or disk storage and may include a conventional database. Fee-only broker-custodian adviser account manager 720 also provides the adviser identifier to the adviser/registered representative.

To associate as a registered representative with independent broker-dealer 900 as described herein and above, the adviser/registered representative may for example request a registration web page hosted by independent broker-dealer 900. Such a request is received by independent broker-dealer representative account manager 920 via input/output 908 of communication interface 910.

In one embodiment, communications interface 910 is any conventional network interface such as a TCP/IP-capable communication interface, which may include a conventional modem, router, LAN interface card or the like, supporting conventional communications protocols, such as TCP/IP and Ethernet. Input/output 908 of communication interface 910 is coupled to network 514. In one embodiment, all communications into, and out of, independent broker-dealer 900 are made via communication interface 910 and input/output 908, and the various actors described herein employ conventional computer systems also connected to network 514 in order to perform the actions described.

When independent broker-dealer representative account manager 920 receives the request from the adviser/registered representative, independent broker-dealer representative account manager 920 provides a user interface to the adviser/registered representative, allowing the adviser/registered representative to provide representative registration information. In one embodiment, representative registration information includes the name and address of the adviser/registered representative, and may include additional or alternate information in other embodiments. Independent broker-dealer representative account manager 920 associates the broker registration information with a unique representative identifier for that adviser/registered representative, and stores the registration information and associated representative identifier as part of a registered representative account in independent broker-dealer representative account storage 922. In one embodiment, independent broker-dealer representative account storage 922 includes conventional memory or disk storage and may include a conventional database.

When the adviser/registered representative has registered as an adviser with fee-only broker/custodian 700, and as a registered representative with independent broker-dealer 900, the adviser/registered representative directs his clients to open accounts with fee-only broker/custodian 700, with independent broker-dealer 900, and with the clearing firm 800 associated with that independent broker-dealer 900. The clients open such accounts as described in more detail herein and below.

To open an account with fee-only broker/custodian 700, each client may for example request a new account web page hosted by fee-only broker/custodian 700. Such a request is received by fee-only broker/custodian client account manager 730, and fee-only broker/custodian client account manager 730 provides a user interface to the client, allowing the client to provide new fee-only broker/custodian account information. In one embodiment, new fee-only broker/custodian account information includes the name and address of the client. Additional or alternate new fee-only broker/custodian account information may be used in other embodiments. Fee-only broker-custodian client account manager 730 also associates the new fee-only broker/custodian account information with a unique fee-only broker/custodian account identifier, and stores the new account information and associated identifier in fee-only broker/custodian client account storage 732. In one embodiment, fee-only broker/custodian client account storage 732 includes conventional memory or disk storage and may include a conventional database. In one embodiment, fee-only broker/custodian client account manager 730 also provides the fee-only broker/custodian account identifier to the client, and the client provides the fee-only broker/custodian account identifier to the adviser/registered representative. Fee-only broker/custodian client account manager 730 may generate at output 738 a printout of an account form for the client to sign.

In one embodiment, the user interface provided by fee-only broker/custodian client account manager 730 also allows the client to supply the name of an investment adviser allowed to make trades on behalf of the account. In this embodiment, fee-only broker/custodian custodian client account manager 730 compares any investment adviser name received from the client to the adviser enrollment information stored in fee-only broker/custodian adviser information storage 722, in order to determine whether the investment adviser identified by the client is an adviser/registered representative enrolled with fee-only broker/custodian 700. If so, fee-only broker/custodian client account manager 730 associates the adviser identifier of that adviser/registered representative with the new account information in fee-only broker/custodian client account storage 732.

In another embodiment, for security purposes, the client is required to verify such investment adviser information in person or via a phone call to a representative (not shown) of fee-only broker/custodian 700 before such an association is made, and in this embodiment fee-only broker/custodian client account manager 730 receives the name of the investment adviser from the representative, along with the client's fee-only broker/custodian account identifier, after such verification has been received. Fee-only broker-custodian client account manager 730 uses the investment adviser's name to find the corresponding adviser identifier in fee-only broker/custodian adviser information storage 722, and associates the adviser identifier with the client account information in fee-only broker/custodian client account storage 732, as described herein and above. Additional or alternate security measures may be used in different embodiments.

To open an account with clearing firm 800 as described herein and above, the client may for example request a new clearing firm account web page hosted by clearing firm 800. Such a request is received by clearing firm account manager 820, for example via input/output 808 of communication interface 810. In one embodiment, communications interface 810 is any conventional network interface such as a TCP/IP-capable communication interface, which may include a conventional modem, router, LAN interface card or the like, supporting conventional communications protocols, such as TCP/IP and Ethernet. Input/output 808 of communication interface 810 is coupled to network 514. In one embodiment, all communications into, and out of, clearing firm 800 are made via communication interface 810 and input/output 808, and the various actors described herein employ conventional computer systems also connected to network 514 in order to perform the actions described.

When clearing firm account manager 820 receives the client's request, clearing firm account manager 820 provides the client with a user interface for supplying new clearing firm account information. In one embodiment, new clearing firm account information includes the name and address of the client, and also includes an identifier, such as a publicly-available business name, of fee-only broker/custodian 700, and the client's fee-only broker/custodian account identifier. This information may be used by the clearing firm to provide information to, and transfer assets to and from the client's fee-only broker/custodian account, as described in more detail herein and below. Additional or alternate clearing firm account information may be used in other embodiments. When clearing firm account manager 820 receives the new clearing firm account information, clearing firm account manager 820 associates the new clearing firm account information with a unique clearing firm account identifier, and stores the new clearing firm account information and associated identifier in clearing firm account storage 822. In one embodiment, clearing firm account manager 820 also provides the clearing firm account identifier to the client, and the client provides the clearing firm account identifier to the adviser/registered representative. Clearing firm account manager 820 may generate at output 818 a printout of an account form for the client to, sign.

To open an account with independent broker-dealer 900 as described herein and above, the client may for example request a new independent broker-dealer client account registration web page. Such a request is received by independent broker-dealer client account manager 930, and independent broker-dealer client account manager 930 provides a user interface to the client for supplying new independent broker-dealer client account information. In one embodiment, new independent broker-dealer client account information includes the name and address of the client; an identifier such as the business name of fee-only broker/custodian 700, along with the client's fee-only broker/custodian account identifier; an identifier such as such as a publicly-available business name of clearing firm 800, along with the client's clearing firm account identifier; and the name of the adviser/registered representative. Additional or alternate independent broker-dealer client account information may be used in other embodiments. Independent broker-dealer client account manager 930 may generate at output 928 a printout of an account form for the client to sign.

When independent broker-dealer client account manager 930 receives the new independent broker-dealer client account information, independent broker-dealer client account manager 930 uses the adviser/registered representative name received as part of such information to find that adviser/registered representative's representative identifier in independent broker-dealer representative account storage 922. Independent broker-dealer client account manager 930 associates that adviser/registered representative's representative identifier with the newly received independent broker-dealer client account information. Independent broker-dealer client account manager 930 also assigns a unique independent broker-dealer client account identifier to the account information, and stores the account information and associated identifiers in independent broker-dealer client account storage 932.

When independent broker-dealer client account manager 930 has stored the independent broker-dealer account information and associated identifiers in independent broker-dealer client account storage 932, independent broker-dealer client account manager 930 provides the independent broker-dealer client account identifier to the client from whom the account information was received, and the client provides this information to the adviser/registered representative.

During the process of opening the account at the independent broker-dealer, or at a later time, the client may supply suitability information for that account to the independent broker-dealer. If the client supplies suitability information when the account is opened, such information is received by independent broker-dealer client account manager 930 and stored in independent broker-dealer client account storage 932, associated with the newly received independent broker-dealer client account information. If the client supplies the suitability information later, the client may for example do so by requesting and receiving an interface from independent broker-dealer client account manager 930 for supplying such information. The client also provides the independent broker-dealer client account identifier, and independent broker-dealer client account manager 930 adds the suitability information to the account information corresponding to that identifier in independent broker-dealer client account storage 932. Suitability information may for example include the client's investment time frame and acceptable risk threshold. For example, a two-year retirement plan will have different time and risk parameters than an aggressive growth-oriented stock portfolio.

When the adviser/registered representative receives the independent broker-dealer client account identifier from independent broker-dealer client account manager 930, as described herein and above, the adviser/registered representative provides the independent broker-dealer client account identifier to clearing firm 800, along with an identifier such as the publicly available business name of independent broker-dealer 900, and the client's clearing firm account identifier. This information is received by clearing firm account manager 820, which uses the clearing firm account identifier to find the client's clearing firm account information in clearing firm account storage 822. Clearing firm account manager 820 adds the identifier of independent broker-dealer 900 and the independent broker-dealer client account identifier and business name identifier to that account information.

It is noted that the order in which the client and adviser/registered representative accounts are created with fee-only broker/custodian 700, clearing firm 800, and independent broker-dealer 900 may be different in different embodiments. When the client and adviser/registered representative accounts have been created with these entities as described herein and above, the adviser/registered representative directs each of his clients to direct wire house 600 to move any non-commission originated assets held for that client by wire house 600 into that client's account at fee-only broker/custodian 700, and to direct wire house 600 to move any commission originated assets held for that client by wire house 600 to the client's account at clearing firm 800, and from there to the client's account at fee-only broker/custodian 700.

In order to direct wire house 600 to so move such assets as requested, each client requests and receives a user interface from wire house transfer accounting manager 630, for example via input/output 608 of communication interface 610. In one embodiment, communications interface 610 is any conventional network interface such as a TCP/IP-capable communication interface, which may include a conventional modem, router, LAN interface card or the like, supporting TCP/IP, Ethernet, and other conventional communications protocols. Input/output 608 of communication interface 610 is coupled to network 514. In one embodiment, all communications into, and out of, wire house 600 are made via communication interface 610 and input/output 608, which is similar or identical to the communication interfaces described above, and the various actors described herein employ conventional computer systems also connected to network 514 in order to perform the actions described. Additionally or alternatively, the client may visit or phone a representative of wire house 600, who may request and receive the user interface from wire house transfer accounting manager 630 as described, and may act as an intermediary between the client and the system.

The user interface provided by wire house transfer accounting manager 630 allows the client, or the representative acting on behalf of the client, to provide the identifiers, for example the publicly available business names, of fee-only broker/custodian 700 and of clearing firm 800, along with the client's fee-only broker/custodian account identifier and clearing firm account identifier, and identifier(s) of any existing accounts for that client with wire house 600. The client also provides authorization to transfer any non-commission originated assets currently held for that client by wire house 600 to that client's account at fee-only broker/custodian 700, and to transfer any commission originated assets currently held for that client by wire house 600 to that client's clearing firm account at clearing firm 800. The client may provide such authorization verbally to the representative, or in writing in the presence of the representative, or may for example provide the authorization by clicking on an authorization button provided as part of the user interface by wire house transfer accounting manager 630, or via another technique.

Wire house transfer accounting manager 630 provides the existing wire house account identifier(s) to wire house account manager 620, which uses the identifiers to locate any existing non-commission originated or commission originated assets held on behalf of the client. Identifiers of such assets may for example be stored associated with the client's wire house account identifier(s) in wire house account storage 622, along with an indication of whether such assets are commission originated assets or non-commission originated assets. In one embodiment, wire house account storage 622 includes a conventional database. Wire house account manager 620 provides those asset identifiers and associated indications to wire house transfer accounting manager 630. Wire house transfer accounting manager 630 transfers any of these assets indicated as non-commission originated assets to the client's fee-only broker/custodian account at fee-only broker/custodian 700 using the received fee-only broker/custodian account identifier and conventional asset transfer techniques. The assets may be physically transferred as well.

Such assets and identifier are received by fee-only broker/custodian custody manager 740 of fee-only broker/custodian 700, which stores the assets or representations thereof in fee-only custody storage 742, associated with the client's fee-only broker/custodian account identifier. In one embodiment, fee-only custody storage 742 includes conventional memory or disk storage, and may include a conventional database. Fee-only broker/custodian custody manager 740 notifies the issuer of the securities of the transfer, including the name or other identifier of the fee-only broker/custodian 700 and the account number used to receive them, via the conventional DTC, NSCC, or other market trading networks 512, or in another embodiment wire house transfer accounting manager 630 performs such notification when the assets are transferred as described herein and above. As a result of the notification, ongoing fees, such as account maintenance fees, related to those securities, will be paid by the issuer to fee-only broker/custodian 700 as described in more detail herein and below.

Fee-only broker-custodian custody manager 740 also adds an indication that the assets were received, along with the date on which the assets were received (which fee-only broker/custodian custody manager 740 may for instance request and receive from a conventional operating system, not shown), to the client's account information in fee-only broker/custodian client account storage 732, along with the date of receipt, the date of purchase if such is provided, or both, and notes there that they were received directly from wire house 600 or otherwise notes that they are non-commission originated assets. Fee-only broker-custodian custody manager 740 also provides the fee-only broker/custodian account identifier and identifiers of the assets received, optionally along with additional information such as the date on which the assets were received, to fee-only broker/custodian notification manager 770, which proceeds as described herein and below.

Wire house transfer accounting manager 630 also transfers any of the client's existing assets indicated as commission originated assets to the client's clearing firm account at clearing firm 800, using the received clearing firm account identifier and conventional asset transfer techniques. Such assets are received by clearing firm initial transfer manager 850 of clearing firm 800. In one embodiment, wire house transfer accounting manager 630 notifies the issuer of the securities of the transfer via market trading networks 512, including the name or other identifier of the clearing firm 800 and the account number at the clearing firm 800 to which the assets were transferred, and in another embodiment such notification is performed by clearing firm initial transfer manager 850 when the assets are received as described herein and below. As a result of the notification, ongoing fees, such as account maintenance fees, related to those securities, will be paid by the issuer to clearing firm 800 as described in more detail herein and below.

When clearing firm initial transfer manager 850 receives the assets and clearing firm account identifier, in one embodiment clearing firm initial transfer manager 850 internally stores the assets and identifier until authorized by the client to transfer such assets to fee-only broker/custodian 700. In this embodiment, the client may for example request and receive a user interface at any time from clearing firm initial transfer manager 850 for providing such authorization. In another embodiment, clearing firm initial transfer manager 850 transfers the assets to fee-only broker/custodian 700 automatically, upon receipt.

To transfer the assets, clearing firm initial transfer manager 850 uses the clearing firm account identifier received along with the assets to find that client's clearing firm account information in clearing firm account storage 822, finds the identifier of fee-only broker/custodian 700 and the client's fee-only broker/custodian account identifier that were included in the clearing firm account information as described herein and above, and uses those identifiers to transfer the assets, using conventional digital or physical asset transfer techniques, to the client's fee-only broker/custodian account at fee-only broker/custodian 700.

Such assets, along with the fee-only broker/custodian account identifier, are received by fee-only broker/custodian custody manager 740 of fee-only broker/custodian 700, which stores the assets in fee-only custody storage 742, associated with the client's fee-only broker/custodian account identifier. Fee-only broker-custodian custody manager 740 also adds a description of the assets received, along with the date on which the assets were received (which fee-only broker/custodian custody manager 740 may for example request and receive from a conventional operating system, not shown), to the client's account information in fee-only broker/custodian client account storage 732. Fee-only broker-custodian custody manager 740 also provides the fee-only broker/custodian account identifier and identifiers of the assets received to fee-only broker/custodian notification manager 770, optionally along with additional information such as the date on which the assets were received.

When fee-only broker/custodian notification manager 770 receives the fee-only broker/custodian account identifier and identifiers of the assets received from fee-only broker/custodian custody manager 740, along with any additional information, fee-only broker/custodian notification manager 770 creates and sends a confirmation to the client that such assets have been transferred to that account, including in the confirmation a description of the assets received. Fee-only broker/custodian notification manager 770 also includes in the confirmation any additional information received. To send the confirmation, fee-only broker/custodian notification manager 770 uses the fee-only account identifier to find the client's address in the client's fee-only broker/custodian account information stored in fee-only broker/custodian client account storage 732, and sends the confirmation to that address. In one embodiment, the client's address is an e-mail address and the confirmation is sent as an e-mail message to that address. In other embodiments, the confirmation may additionally or alternatively be sent in other formats, such as by mail to a postal address.

At any time, the adviser/registered representative may determine whether any fees are due on any accounts for which the adviser/registered representative acts as an investment adviser. If fees are due, the adviser/registered representative provides fee-only broker/custodian 700 with the fee-only broker/custodian account identifier of each account for which fees are due, along with the amount due, and with the adviser/registered representative's adviser identifier. Such information is received by fee-only broker/custodian fee manager 760, which debits the fees due from the corresponding account in fee-only broker/custodian client account storage 732. In one embodiment, the assets held for such accounts in fee-only broker/custodian custody storage 742 include cash assets against which such fees may be debited. Fee-only broker-custodian fee manager 760 journals any such fees to the adviser account associated with the received adviser identifier in fee-only broker/custodian adviser information storage 722.

In one embodiment, fee-only broker/custodian 700 periodically (e.g. once a day) makes reports (as described above) available for download by independent broker-dealer 900. In this embodiment, fee-only broker/custodian report manager 780 includes an internal clock. In another embodiment, independent broker-dealer 900 may request such reports at any time by providing one or more fee-only broker/custodian account identifiers, and such requests are received by fee-only broker/custodian report manager 780. When fee-only broker/custodian report manager 780 receives the request, or when fee-only broker/custodian report manager 780 determines that a reporting period has elapsed, fee-only broker/custodian report manager 780 creates for each account (or for each requested account) a report listing all the assets associated with that account and any account activity recorded within a past period of time (e.g. the past two months) in fee-only broker/custodian client account storage 732. Fee-only broker-custodian report manager 780 may for example post the reports on a web site accessible only to independent broker-dealer 900, for example using conventional secure login and transmission techniques such as SSL.

Such reports are downloaded by independent broker-dealer download manager 980 and provided to independent broker-dealer audit manager 982. Independent broker-dealer audit manager 982 uses the reports to monitor the adviser/registered representative's compliance with securities laws, including NASD rules as well as the suitability analysis described herein using conventional techniques, and/or provides a user interface to a human representative of independent broker-dealer 900 for performing such monitoring. As part of such monitoring, for each account, independent broker-dealer audit manager 982 may request and receive from the adviser/registered representative associated with that account information indicating whether each asset included in the account is a commission originated or a non-commission originated asset, which may be used as part of a suitability analysis as described herein and below.

Independent broker-dealer audit manager 982 uses the fee-only broker/custodian account identifier included in the downloads to find the independent broker-dealer client account identifier associated with that fee-only broker/custodian account identifier or clearing firm account identifier in independent broker-dealer client account storage 932. Independent broker-dealer audit manager 982 stores the downloads associated with that independent broker-dealer client account identifier in independent broker-dealer client account storage 932, along with the date on which such downloads were received, which independent broker-dealer audit manager 982 may for instance request and receive from a conventional operating system (not shown).

At any time, clearing firm 800 may receive transaction, distribution and service fees ("service fees") relating to a client's account from an asset manager or issuer of securities. Such asset managers may for example be part of market trading networks 512. In one embodiment, the service fees include the clearing firm account identifier of the account for which the fees are being paid, which the asset manager may for example receive as part of any trades relating to that asset performed by clearing firm 800 as described herein. The service fees and account identifier are received by clearing firm fee manager 860 of clearing firm 800. Clearing firm fee manager 860 locates the clearing firm account information associated with that identifier in clearing firm account storage 822, and locates the identifier of independent broker-dealer 900 and the independent broker-dealer client account identifier included in that clearing firm account information. Clearing firm fee manager 860 uses the independent broker-dealer identifier to transfer the fees and the independent broker-dealer client account identifier to independent broker-dealer 900, using conventional money-transfer techniques. The fees and identifier are received by independent broker-dealer fee manager 970 of independent broker-dealer 900.

When independent broker-dealer fee manager 970 receives the fees and identifier, independent broker-dealer fee manager 970 finds the account information corresponding to the received independent broker-dealer client account identifier in independent broker-dealer client account storage 932, and the representative identifier included in that account information. Independent broker-dealer fee manager 970 uses that representative identifier to find the adviser/registered representative's account in independent broker-dealer representative account storage 922, and journals all or a first portion of the received fees to that account. Independent broker-dealer fee manager 970 retains the remainder of the received fees. The amount retained by independent broker-dealer fee manager 970 may vary in different embodiments, but may be, for example, ten percent of the received fees.

At any time, the adviser/registered representative may elect to make a trade on behalf of one of the clients. In order to make the trade, the adviser/registered representative evaluates whether the trade will be made on a commission originated or a non-commission originated basis. In order to perform such an evaluation, the adviser/registered representative may request and receive a user interface from an administration system 510 that lists tradable assets and whether each asset is available on a commission originated or a non-commission originated basis. In one embodiment, as described herein, a commission originated asset is any asset that may be traded by the independent broker-dealer, while a non-commission originated asset is any asset that may be traded by the fee-only broker/custodian. In one embodiment, administration system 510 includes conventional portfolio management software for listing such information, and administration system 510 may be hosted by the adviser/registered representative's conventional computer system or available to the adviser/registered representative using that conventional computer system via network 514. Some assets may be available on either a commission originated or a non-commission originated basis only, while other assets may be available on either basis, at the choice of the adviser/registered representative.

If the adviser/registered representative elects to make the trade on a non-commission originated basis, the adviser/registered representative instructs fee-only broker/custodian 700 to make the trade, for example by requesting and receiving a user interface from fee-only broker/custodian non-commission originated trade manager 750 and providing, via the user interface, the adviser/registered representative's adviser identifier; the fee-only broker/custodian client account identifier of the client on whose behalf the trade is being made; and trade information, such as identifiers of the assets to be traded, an indication of whether such assets are being bought or sold, and the total value of the trade. Additional or alternate trade information may be used in other embodiments.

When fee-only broker/custodian non-commission originated trade manager 750 receives the trade information and identifiers, fee-only broker/custodian non-commission originated trade manager 750 uses the received fee-only broker/custodian client account identifier to find the client's account information in fee-only broker/custodian client account storage 732, and determines whether the received adviser identifier is associated with that account. If so, fee-only broker/custodian non-commission originated trade manager 750 also determines whether the account includes sufficient assets to make the trade. If the adviser/registered representative's adviser identifier is not associated with the account, or if the account does not include sufficient assets to make the trade, fee-only broker/custodian non-commission originated trade manager 750 provides an indication to the adviser/registered representative that the trade cannot be made.

Otherwise, fee-only broker/custodian non-commission originated trade manager 750 clears the trade, or uses a third party to clear the trade, for example via market trading networks 512. Fee-only broker-custodian non-commission originated trade manager 750 settles the trade using the assets associated with that account in fee-only broker/custodian custody storage 742. For example, if the trade was to purchase securities, fee-only broker/custodian non-commission originated trade manager 750 would use cash assets associated with the account to settle the trade (in one embodiment using conventional money transfer techniques), and if the trade was to sell securities, fee-only broker/custodian non-commission originated trade manager 750 would use those securities to settle the trade (in one embodiment by transferring identifiers such as serial numbers of those securities). Fee-only broker-custodian non-commission originated trade manager 750 adds an indication to the client's account information in fee-only broker-custodian client account storage 732 that the assets were transferred out of the account, along with the date of the trade, which fee-only broker/custodian non-commission originated trade manager 750 may for example request and receive from a conventional operating system (not shown). Fee-only broker-custodian non-commission originated trade manager 750 stores any assets received as part of the trade in fee-only broker/custodian custody storage 742, associated with the fee-only broker/custodian client account identifier, and adds an indication that those assets were received to the account information for that account in fee-only client account storage 732, along with the date of the trade, received as described herein, and a notation that the assets are non-commission originated. Fee-only broker-custodian non-commission originated trade manager 750 may also assign a unique trade identifier to the trade and include the trade identifier in the indications of both the assets transferred out of the account and the assets received for the account as part of the trade.

Fee-only broker-custodian non-commission originated trade manager 750 also provides the fee-only broker/custodian account identifier and identifiers of the assets traded, optionally along with additional information such as the date of the trade and the trade identifier, to fee-only broker/custodian notification manager 770, which creates a confirmation indicating to the client that such assets have been received for and transferred out of the account as part of a trade. Fee-only broker/custodian notification manager 770 sends the confirmation to the client as described herein and above.

As described herein and above, the adviser/registered representative may also elect to place the trade on a commission basis. If the adviser/registered representative elects to make the trade on a commission basis, the adviser/registered representative proposes the trade to independent broker-dealer 900, for example by requesting and receiving a user interface for proposing the trade from independent broker-dealer commission originated trade manager 950. The adviser/registered representative provides, via the user interface, the adviser/registered representative's representative identifier; the independent broker-dealer client account identifier of the client on whose behalf the trade is being made; and trade information, such as identifiers of the assets to be traded, an indication of whether such assets are being bought or sold, and the total value of the trade. Additional or alternate trade information may be used in other embodiments. When independent broker-dealer commission originated trade manager 950 receives the trade information and the independent broker-dealer client account identifier, independent broker-dealer commission originated trade manager 950 provides this information to independent broker-dealer suitability analyzer 940.

When independent broker-dealer suitability analyzer 940 receives the trade information and the independent broker-dealer client account identifier, independent broker-dealer suitability analyzer 940 uses the independent broker-dealer client account identifier to locate the client's account information in independent broker-dealer client account storage 932, and performs conventional suitability analysis on the received trade information, the suitability information included in that account information as described herein and above, and also downloads associated with the same independent broker-dealer client account identifier, to determine whether or not the trade is suitable for the account. Independent broker-dealer suitability analyzer 940 may use conventional analytic techniques to perform the determination, and/or may provide a user interface to a human representative of independent broker-dealer 900 for making such a determination.

If independent broker-dealer suitability analyzer 940 determines, or receives a determination from the representative, that the trade information and the downloaded account information corresponds to the suitability information, independent broker-dealer suitability analyzer 940 allows the trade, and otherwise, independent broker-dealer suitability analyzer 940 disallows the trade.

If the trade is disallowed, independent broker-dealer suitability analyzer 940 provides an indication that the trade is disallowed to independent broker-dealer commission originated trade manager 950, and independent broker-dealer commission originated trade manager 950 indicates to the adviser/registered representative via the user interface that the trade is disallowed. In one embodiment, the adviser/registered representative takes no further action to make the trade, but may elect to make another trade at any time as described herein and above. In another embodiment, the adviser/registered representative may provide the trade information to independent broker-dealer 900 for suitability analysis after the trade has been performed, and if the trade is disallowed, the adviser/registered representative may reverse the trade, or other remedial action may be taken.

Otherwise, if the trade is allowed, independent broker-dealer suitability analyzer 940 provides an indication that the trade is allowed to independent broker-dealer commission originated trade manager 950. When independent broker-dealer commission originated trade manager 950 receives the indication that the trade is allowed, or in the embodiment that trades are performed before suitability analysis is performed, independent broker-dealer commission originated trade manager 950 locates the identifier of fee-only broker/custodian 700 and the client's fee-only broker/custodian account identifier, as well as the identifier of clearing firm 800 and the client's clearing firm account identifier, included in the client's account information in independent broker-dealer client account storage 932 as described herein and above. Independent broker-dealer commission originated trade manager 950 forwards the client's clearing firm account identifier, the identifier of fee-only broker/custodian 700, and the client's fee-only broker/custodian account identifier, along with the trade information received from the adviser/registered representative, to clearing firm 800. This information is received by clearing firm trade manager 830 of clearing firm 800, which proceeds as described herein and below. Independent broker-dealer commission originated trade manager 950 also stores the trade information and the independent broker-dealer client account identifier in independent broker-dealer trade storage 952, in one embodiment along with the date of the trade, which independent broker-dealer commission originated trade manager 950 may for example request and receive from a conventional operating system (not shown). Independent broker-dealer commission originated trade manager 950 also provides an indication to the adviser/registered representative that the trade has been ordered.

When the adviser/registered representative receives the indication that the trade has been ordered, the adviser/registered representative authorizes fee-only broker/custodian 700 to settle the trade, for example by requesting and receiving a user interface from fee-only broker/custodian commission originated trade manager 754 and providing, via the user interface, the adviser/registered representative's adviser identifier; the fee-only broker/custodian client account identifier of the client on whose behalf the trade is being made; and the trade information.

When fee-only broker/custodian commission originated trade manager 754 receives the trade information and identifiers, fee-only broker/custodian commission originated trade manager 754 uses the received fee-only broker/custodian client account identifier to find the client's account information in fee-only broker/custodian client account storage 732, and determines whether the received adviser identifier is associated with that account. If not, fee-only broker/custodian commission originated trade manager 754 indicates to the adviser/registered representative that the trade cannot be authorized. Otherwise, fee-only broker/custodian commission originated trade manager 754 adds the fee-only broker/custodian client account identifier and the trade information to fee-only broker/custodian pending trade storage 756. In one embodiment, fee-only broker/custodian pending trade storage 756 includes a conventional database. Fee-only broker-custodian commission originated trade manager 754 also adds a pointer to that trade information to the client's account information in fee-only broker/custodian client account storage 732.

When clearing firm trade manager 830 of clearing firm 800 receives the trade information, the client's clearing firm account identifier, the identifier of fee-only broker/custodian 700, and the fee-only broker/custodian account identifier from independent broker-dealer commission originated trade manager 950 as described herein and above, in one embodiment clearing firm trade manager 830 executes the trade. Clearing firm trade manager 830 also generates a letter of free funds. In one embodiment, clearing firm trade manager 830 assigns a unique identifier to the trade and includes this identifier in the letter of free funds, along with the trade information and the fee-only broker/custodian account identifier. Clearing firm trade manager 830 may include additional or alternate information in the letter of free funds in other embodiments.

As described herein, the letter of free funds may be generated and provided for authorization as described herein and below either before or after the trade is executed. In the embodiment that the letter of free funds is created after the trade is executed, clearing firm trade manager 830 executes the trade in such a way that the trade may be reversed at the direction of fee-only broker/custodian 700 as described herein and below. Clearing firm trade manager 830 stores the trade information in clearing firm account storage 822, associated with the clearing firm account identifier, the trade identifier, the identifier of fee-only broker/custodian 700, and the fee-only broker/custodian account identifier, as well as, in the embodiment that the trade was executed, any assets received as a result of the trade.

When clearing firm trade manager 830 has generated the letter of free funds, clearing firm trade manager 830 provides the letter of free funds to fee-only broker/custodian 700, and the letter of free funds is received by fee-only broker/custodian commission originated trade manager 754 of fee-only broker/custodian 700. When fee-only broker/custodian commission originated trade manager 754 receives the letter of free funds, fee-only broker/custodian commission originated trade manager 754 uses the fee-only broker/custodian client account identifier included in the letter of free funds to find the client's account information in fee-only broker/custodian client account storage 732. If the client's account information includes a pointer to trade information in fee-only broker/custodian pending trade storage 756 that matches the trade information in the letter of free funds, fee-only broker/custodian commission originated trade manager 754 determines that the trade is authorized, and otherwise, that the trade is not authorized. If the trade is authorized, fee-only broker/custodian commission originated trade manager 754 deletes the pointer from the account information and the associated trade information from fee-only broker/custodian pending trade storage 756, and also uses the account information in fee-only broker/custodian client account storage 732 to determine whether the account includes sufficient assets to support the trade as described herein.

If the trade is not authorized, or if the account does not include sufficient assets to support the trade, fee-only broker/custodian commission originated trade manager 754 provides an indication to clearing firm 800 that the trade should not be performed or should be reversed, along with the trade identifier included in the letter of free funds. The indication is received by clearing firm trade manager 830 of clearing firm 800. If the trade has not been performed, clearing firm trade manager 830 does not perform the trade, and if the trade has been performed, clearing firm trade manager 830 either cancels the trade or settles the trade directly, using conventional market trading techniques.

If fee-only broker/custodian commission originated trade manager 754 determines that the trade is authorized and the account can support the trade, fee-only broker/custodian commission originated trade manager 754 provides an indication to clearing firm 800 that the trade should be performed, along with the trade identifier included in the letter of free funds, the fee-only broker/custodian client account identifier, and the assets required to settle the trade. For example, if the trade involves buying securities, funds may be required to settle the trade, while if the trade involves selling securities, the securities to be sold will be required. Fee-only broker-custodian commission originated trade manager 754 retrieves the required assets or identifiers thereof that are associated with the client's account from fee-only broker/custodian custody storage 742. To provide the assets to clearing firm 800, fee-only broker/custodian commission originated trade manager 754 may for example use conventional money transfer techniques, and/or may provide the serial numbers of share certificates associated with the securities. Other techniques for transferring assets, such as sending share certificates by mail, may be additionally or alternatively used in other embodiments. Fee-only broker-custodian commission originated trade manager 754 adds an indication to the client's account information in fee-only broker/custodian client account storage 732 that the assets have been removed from the account, along with the date, which fee-only broker/custodian commission originated trade manager 754 may for example request and receive from an operating system (not shown), and the trade identifier.

Clearing firm trade manager 830 of clearing firm 800 receives the indication that the trade should be performed, along with the associated identifiers and the assets required to settle the trade, from fee-only broker/custodian commission originated trade manager 754. When clearing firm trade manager 830 receives this information, in the embodiment that the trade was not previously performed, clearing firm trade manager 830 uses the trade identifier to find the trade information and the associated identifiers in clearing firm account storage 822, and performs the trade, for example via market trading networks 512. In the embodiment that the trade was previously performed, clearing firm trade manager 830 retrieves the assets received as a result of the trade from clearing firm account storage 822. Clearing firm trade manager 830 provides the assets received as a result of the trade, along with the trade identifier, and the identifier of fee-only broker/custodian 700 and the fee-only broker/custodian account identifier stored associated with the trade information in clearing firm account storage 822 as described herein and above, to clearing firm settlement manager 840, which proceeds as described herein and below. Clearing firm trade manager 830 also provides the trade information, along with the clearing firm account identifier, to clearing firm confirmation manager 870.

When clearing firm confirmation manager 870 receives the trade information and the clearing firm account identifier, clearing firm confirmation manager 870 creates and sends a confirmation to the client that the trade has been executed. Clearing firm confirmation manager 870 may include any or all of the trade information and the clearing firm account identifier in the confirmation. To send the confirmation, clearing firm confirmation manager 870 uses the clearing firm account identifier to find the client's clearing firm account information stored in clearing firm account storage 822, and sends the confirmation to the client address included in that account information. In one embodiment, the client's address is an e-mail address and the confirmation is sent as an e-mail message to that address. In other embodiments, the confirmation may additionally or alternatively be sent in other formats, such as by mail to a postal address.

When clearing firm settlement manager 840 receives the assets, trade identifier, identifier of fee-only broker/custodian 700, and the fee-only broker/custodian client account identifier from clearing firm trade manager 830 as described herein and above, in one embodiment clearing firm settlement manager 840 provides the assets to fee-only broker/custodian 700, for example using asset transfer techniques at least similar to those described herein and above, along with the fee-only broker/custodian client account identifier and the trade identifier, and the assets and identifiers are received by fee-only broker/custodian custody account manager 740 of fee-only broker/custodian 700. In another embodiment, clearing firm settlement manager 840 retains the assets and associated identifiers until instructed by the client to transfer the assets. In this embodiment, at any time, the client may request and receive from clearing firm settlement manager 840 a user interface for providing such instruction.

When fee-only broker/custodian custody manager 740 receives the assets and identifiers, fee-only broker/custodian custody manager 740 stores the assets in fee-only broker/custodian custody storage 742, associated with the client's fee-only broker/custodian account identifier. Fee-only broker/custodian custody manager 740 also adds an indication that the assets were received, along with the trade identifier and the date on which the assets were received (which may for instance be requested and received from an operating system, not shown), to the client's account information in fee-only broker/custodian client account storage 732.

In one embodiment, fee-only broker/custodian custody manager 740 provides the fee-only broker/custodian account identifier, identifiers of the assets received, and identifiers of any assets removed from the account as part of the same trade (as indicated by the trade identifier), optionally along with additional information such as the dates on which such assets were received and removed, to fee-only broker/custodian notification manager 770, and fee-only broker/custodian notification manager 770 sends a notice of execution to the client including this information, in a manner at least similar to that of sending a confirmation as described herein and above.

In one embodiment, fee-only broker/custodian 700 periodically (e.g. once a month) sends statements to each client. The statements may be sent out on the same day, or on different days; for example, in one embodiment, when fee-only broker/custodian client account manager 730 adds new fee-only broker/custodian account information to fee-only broker/custodian client account storage 732 as described herein and above, fee-only broker/custodian client account manager 730 also associates the account information with a random number between 1 and 28. In this embodiment, every day fee-only broker/custodian statement manager 790 compares the current day of the month (which fee-only broker/custodian statement manager 790 may for example request and receive from a conventional operating system, not shown) to the number associated with each client account, and creates statements for each client account for which the associated number matches the day of the month. In another embodiment, fee-only broker/custodian statement manager 790 creates statements for each client account on a predetermined day of each month, for example the last day of each month.

To create the statement for the client account, fee-only broker/custodian statement manager 790 lists in the statement all activity on the account in the period since a report was last created for that account (e.g. in the last month), including the indications of assets removed from or received for the account as part of a trade, which may be stored as part of the account information in fee-only broker/custodian client account storage 732 as described herein and above. Fee-only broker-custodian statement manager 790 also includes identifiers of all assets associated with that account in fee-only broker/custodian custody storage 742. The statements may include both commission originated assets and non-commission originated assets from any number of trades, as well as the assets transferred from the wire house, thereby providing in a single location all assets corresponding to the account wherever they are custodied. Fee-only broker-custodian statement manager 790 uses the fee-only account identifier associated with that account information to find the client's address in the client's fee-only broker/custodian account information stored in fee-only broker/custodian client account storage 732, and sends the statement to that address. In one embodiment, the client's address is an e-mail address and the statement is sent as an e-mail message to that address. In other embodiments, the statement may additionally or alternatively be sent in other formats, such as by mail to a postal address.

Any number of trades of commission originated and non-commission originated assets may thus be made in the manner, or suing the system, described above, with all such assets resulting, and assets remaining that were transferred from the wire house, reflected in a single statement. The same advisor/registered representative may thus trade, for the same client, commission-originated securities and non-commission originated securities as described herein, and the client will receive a single statement detailing both types of securities as being held by that client, as well as an indication of both types of trades, in spite of the fact that they were made through different entities (the fee-only broker/custodian and the independent broker/dealer) that were not both under corporate or other organizational control by a single party or by one such entity. Any number of advisor/registered representatives may be supported in this fashion, and different ones may use different independent broker-dealers, but use the same fee-only broker/custodian.

What is claimed is:

1. A system for trading a first security and a second security on behalf of a client, comprising:

a fee-only broker/custodian non-commission-originated trade manager comprising a set of at least one hardware processor coupled to at least one memory and having an input for receiving from an advisor instructions to make a trade of the first security on behalf of the client that the advisor wishes to trade on a non-commission originated basis, the fee-only broker/custodian non-commission originated trade manager for clearing the trade of the first security and providing information about the trade of the first security at an output;

an independent broker-dealer commission originated trade manager comprising a hardware processor coupled to a memory and having an input for receiving from the advisor instructions to make a trade of the second security on behalf of the client that the advisor wishes to trade on a commission-originated basis, the independent broker-dealer commission originated trade manager for providing the information about the trade of the second security at an output coupled to a network of financial services computer systems;

a fee only broker/custodian commission originated trade manager comprising the set of at least one hardware processor coupled to at least one memory and having an input for receiving an authorization from the advisor to settle the trade of the second security and an account identifier of the client, the fee only broker/custodian commission originated trade manager for providing, in response to a request received at an input/output, an approval of said trade and assets to be used in said trade via the fee only broker/custodian commission originated trade manager input/output coupled to the network of financial services computer systems responsive to the advisor being associated with the account identifier and the account having assets sufficient to support said trade and for providing at an output information about the trade of the second security;

a clearing firm trade manager comprising the set of at least one hardware processor coupled to at least one memory and having an input coupled to the network of financial services computer systems for receiving the information about the trade of the second security from the independent broker-dealer commission originated trade manager, the clearing firm trade manager for executing the trade of the second security responsive to the information received at the clearing firm trade manager input, and for requesting and receiving via an input/output coupled to the network of financial services computer systems the approval and assets from the fee only broker/custodian commission originated trade manager input/output, said trade being performed or maintained in response to said approval and assets; and a fee-only broker-custodian statement manager comprising the set of at least one hardware processor coupled to at least one memory and having an input coupled to the fee-only broker/custodian non-commission-originated trade manager output for receiving at least some of the information about the trade of the first security; and coupled to the fee only broker/custodian commission originated trade manager output for receiving at least some of information about the trade of the second security, the fee-only broker-custodian statement manager for providing at an output a statement of assets of the client responsive to the at least some of the information about the trade of the first security and the at least some of the information about the trade of the second security received at the fee-only broker-custodian statement manager input.

2. The method of claim 1:

additionally comprising an independent broker-dealer suitability analyzer comprising the set of at least one hardware processor coupled to at least one memory and having an input for receiving suitability information about the client, and coupled to the independent broker-dealer commission originated trade manager output for receiving at least some of the information about the trade of the second security, the independent broker-dealer suitability analyzer for evaluating whether the trade of the second security is suitable for the client responsive to the suitability information about the client and the at least some of the information about the trade of the second security, and for providing at an output an indication of whether the trade of the second security is suitable for the client; and wherein:

the independent broker-dealer commission originated trade manager additionally receives at the independent broker-dealer commission originated trade manager input the indication of whether the trade of the second security is suitable for the client; and the independent broker-dealer commission originated trade manager provides the information about the trade of the second security to the clearing firm trade manager responsive to the indication of whether the trade of the second security is suitable for the client indicates that the trade of the second security is suitable for the client.

* * * * *